United States Patent [19]
Kight et al.

[11] Patent Number: 5,961,734
[45] Date of Patent: *Oct. 5, 1999

[54] METHODS FOR PURGING PROCESS LINES OF ADDITIVES FOR THERMOPLASTIC MATERIALS

[75] Inventors: Daniel H. Kight; Carl R. Holzer, Jr.; Dan R. Yon, all of Anderson, S.C.

[73] Assignee: BASF Corporation, Mt. Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,535

[22] Filed: Jun. 4, 1997

[51] Int. Cl.⁶ ............................... B08B 7/04; B08B 9/06
[52] U.S. Cl. ................ 134/10; 134/22.11; 134/22.12; 134/37; 134/168 C; 134/169 C
[58] Field of Search ................... 134/10, 22.1, 22.11, 134/22.12, 22.18, 18, 37, 166 C, 169 C, 168 C; 137/239, 563

[56] References Cited

U.S. PATENT DOCUMENTS

| | | | |
|---|---|---|---|
| 3,510,350 | 5/1970 | Priebe | 134/22.12 |
| 4,402,760 | 9/1983 | Strong | 134/10 |
| 4,534,802 | 8/1985 | Gates et al. | 134/22.12 |
| 4,548,652 | 10/1985 | Kelly et al. | 134/22.12 |
| 4,627,465 | 12/1986 | Kolibas et al. | 137/563 |
| 4,750,941 | 6/1988 | Gerich | 134/22.12 |
| 4,902,352 | 2/1990 | Christian | 134/22.12 |
| 5,192,595 | 3/1993 | Akeel et al. | 427/421 |
| 5,221,047 | 6/1993 | Akeel | 239/123 |
| 5,282,889 | 2/1994 | Franklin | 134/18 |
| 5,322,571 | 6/1994 | Plummer et al. | 134/22.12 |
| 5,405,452 | 4/1995 | Anderson et al. | 134/22.12 |

FOREIGN PATENT DOCUMENTS

| | | |
|---|---|---|
| 39 10 770 | 10/1990 | Germany . |
| 56-101 838 | 8/1981 | Japan . |
| 62-144775 | 12/1987 | Japan . |

*Primary Examiner*—Jill Warden
*Assistant Examiner*—Saeed Chaudhry

[57] ABSTRACT

Methods are provided whereby additive for thermoplastic materials may be recovered in a primary additive supply system simultaneously with the supply of an additive from a secondary additive supply system to a molten thermoplastic stream. Each of the primary and secondary additive supply systems is provided with respective recirculation lines so as to prevent sedimentation of the additive. According to the present invention, therefore, a protocol is employed whereby substantially all of the additive in the additive supply system, including that quantity of additive in the recirculation lines, may be recovered so that a fresh supply of additive (which oftentimes is different from the previous additive) may be connected for injection into the molten thermoplastic stream at the appropriate time.

22 Claims, 13 Drawing Sheets

METHODS FOR PURGING PROCESS LINES OF ADDITIVES FOR THERMOPLASTIC MATERIALS

FIELD OF INVENTION

The present invention generally relates to systems and methods by which process lines may be purged. In preferred embodiments, this invention relates to systems and methods whereby process lines may be flushed and cleaned quickly of residual additives for thermoplastic materials (e.g., additives that are blended into molten thermoplastic materials prior to shaping into useful objects).

BACKGROUND AND SUMMARY OF THE INVENTION

It is well known that process lines may be purged (i.e., flushed and cleaned) using an air/solvent/air protocol. For example, U.S. Pat. Nos. 4,902,352 and 5,322,571 disclose generally that process lines employed in painting systems may be purged by alternately flowing solvent and air through the lines to remove residual material which is exhausted to a sump. (Please see in this regard, the '352 patent at column 1, lines 10–21 and the '571 patent at column 1, lines 28–34.)

Recently, however, techniques have been proposed whereby additives may be injected directly into a flow of thermoplastic material so as to effect changes in that thermoplastic material's properties (e.g., in terms of color, physical and/or chemical properties, depending on the particular additive employed) which, in turn, effects changes in the properties of the resulting shaped articles, for example, synthetic melt-spun filaments. (Please see in this regard, commonly owned, copending U.S. Provisional Application Ser. No. 60/012,794 filed on Mar. 4, 1995, the entire content of which is expressly incorporated hereinto by reference.) By use of such techniques, the properties of the filaments may be changed periodically without necessarily stopping the filament production equipment thereby avoiding costly equipment down time to change from one product recipe to another.

When changing from one product recipe to another, however, it becomes necessary to purge the process lines so as to recover to as great an extent as practical the previously supplied additive. In addition, the recovering and purging process of the previously supplied additive is most preferably accomplished simultaneously with the supply and injection of another additive using a stand-by additive supply system. In this way, the polymer extruder and its associated filament spinning line are not required to be shut down during additive change-over.

It would therefore be highly desirable if a system was provided which enabled substantially complete recovery of an additive for a thermoplastic material simultaneously during supply and injection of another additive into a molten stream of the thermoplastic material. It is towards fulfilling such a need that the present invention is directed.

Broadly, according to the present invention, systems and methods are provided whereby additive may be recovered in a primary additive supply system simultaneously with the supply and injection of an additive from a secondary additive supply system. Each of the primary and secondary additive supply systems is provided with respective recirculation lines so as to prevent sedimentation of the additive. According to the present invention, therefore, a protocol is employed whereby substantially all of the additive in the additive supply system, including that quantity of additive in the recirculation lines, may be recovered so that a fresh supply of additive (which oftentimes is different from the previous additive) may be connected for injection into the molten thermoplastic stream at the appropriate time.

These and other aspects and advantages of the present invention will become more clear after careful consideration is given to the following detailed description of the preferred exemplary embodiments thereof.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

The term "additive" as used herein is meant to refer to virtually any material in liquid or solid form that may be added physically to a thermoplastic polymer melt flow. The term "additive" thus generically encompasses pigments and colorants which are employed to impart a desired color attribute to the polymer melt flow, in addition to functional additives, such as, for example, UV light absorbers, fillers, processing aids, impact modifiers and other similar materials conventionally incorporated into thermoplastic polymers as may be desired in dependence upon the end use requirements.

Figure 1A:
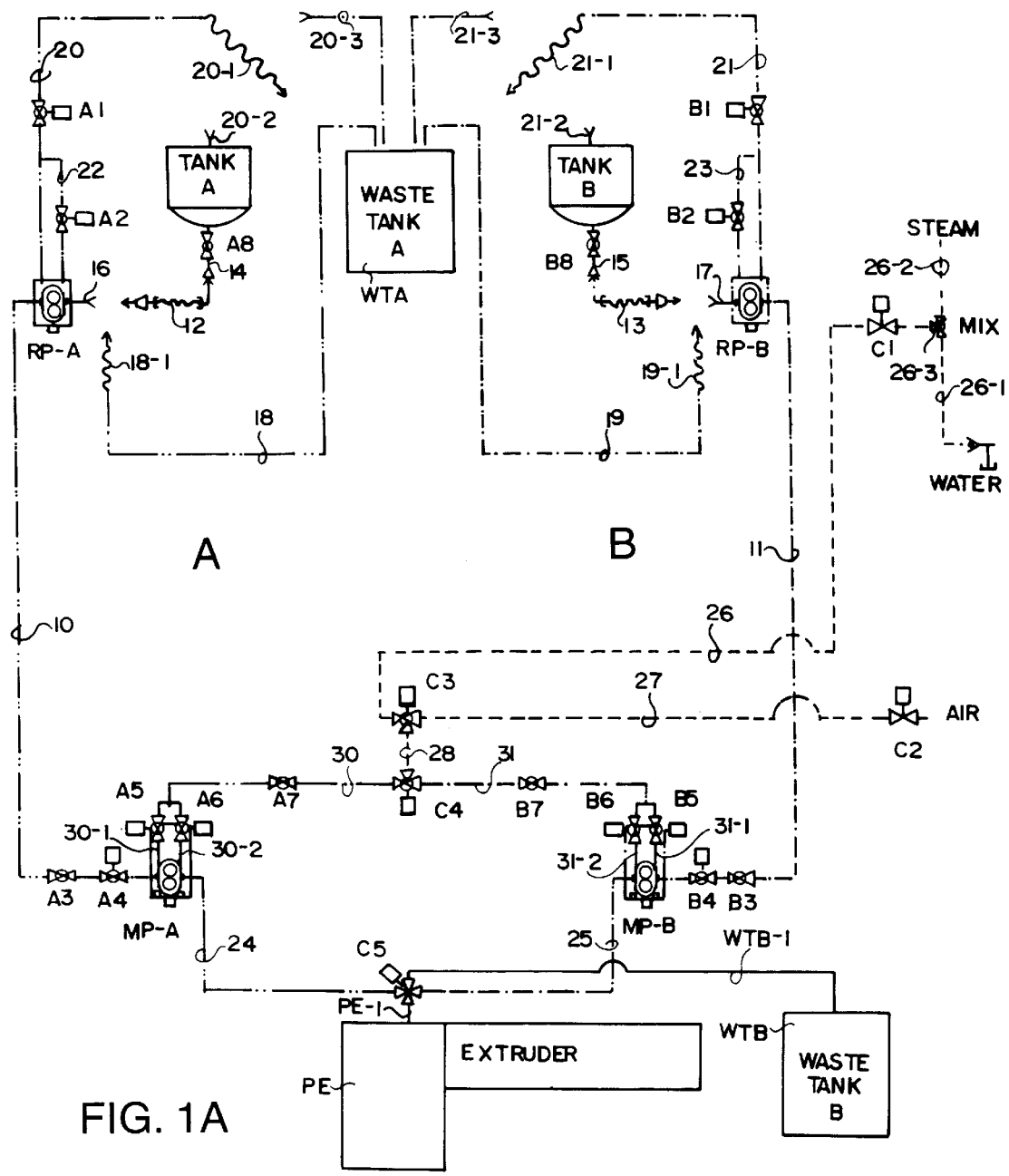
FIG. 1A is a schematic representation of a preferred system according to the present invention showing all components thereof in an "at rest" condition.

As shown in accompanying FIG. 1A, the system according to the present invention generally includes a symmetrical pair of additive supply systems A and B (hereinafter more simply referred to as the "A-side system" and the "B-side system", respectively). Although the discussion which follows will emphasize the structures and functions of the A-side system, it will be understood that similar structures and functions are present in the B-side system. Therefore, in the following discussion, wherever possible, the structures and attendant functions present in the B-side system will appear parenthetically next to the corresponding structures and attendant functions associated with the A-side system under discussion.

The A-side system is provided with a main additive supply line 10 (11) which fluid-connects the recirculation pump RP-A (RP-B) located near the additive supply tank A (supply tank B) and the metering pump MP-A (MP-B) located near the polymer extruder PE. The supply tank A includes a flexible discharge line 12 (13) which may be connected to the tank discharge line 14 (15) associated with the additive supply tank A (tank B). A manually operated shut-off valve A8 (B8) is provided in the tank discharge line 14 (15).

The input line 16 (17) of the recirculation pump RP-A (RP-B) may be fluid-connected to either the flexible discharge line 12 associated with the additive supply tank A, or the flexible coupling 18-1 (19-1) associated with the waste line 18 (19) from the waste tank A common to both A-side and B-side systems. A recirculation line 20 (21) extends from the recirculation pump RP-A (RP-B) and terminates in a flexible coupling 20-1 (21-1) which is adapted to being fluid-connected to either the input coupling 20-2 (21-2) associated with the additive supply tank A (tank B) or the waste line 20-3 (21-3) associated with the waste tank A. A servo controlled throttling valve A1 (B1) is provided in the recirculation line 20 (21). In this regard, the recirculation pump RP-A is most preferably operated at a substantially constant speed. A substantially constant pressure is thereby controlled in the main supply line 10 (11) by opening or closing the valve A1 (B1) so as to restrict recirculation flow back to the tank A (tank B) via line 20. A pump bypass line 22 (23) is also provided and fluid-connects the recirculation line 20 (21) upstream of the valve A1 (B1) to the input (low pressure) side of recirculation pump RP-A (RP-B) through solenoid actuated valve A2 (B2).

The main additive line 10 (11) includes manually operated and solenoid actuated valves A3, A4 (B3, B4), respectively, upstream of the metering pump MP-A (MP-B). The downstream (high pressure) side of the metering pump MP-A (MP-B) is fluid-connected to the polymer extruder PE via supply line 24 (25) through four-way solenoid actuated valve C5. The flow into the control valve C5 may be directed either to the polymer extruder PE via line PE-1 or to the waste tank B WTB via line WTB-1.

Additive recovery, purging and cleaning of the process lines are accomplished using a heated solvent (water) supplied via line 26 and compressed air supplied via line 27.

The fluids in lines 26 and 27 are directed to three-way solenoid actuated valve C3. Control of the flow of heated water and compressed air is accomplished with solenoid actuated valves C1 and C2, respectively, in lines 26, 27. The heated water is obtained by mixing plant water via line 26-1 with steam via line 26-2 at mixing valve 26-3. The mixture is then supplied to the valve C1 and on to the valve C3 via line 26.

Control valve C3 is fluid-connected downstream to a solenoid actuated three-way valve C4 via solvent supply line 28. Branch solvent line 30 (31) is provided with a manually operated shut-off valve A7 (B7) and fluid-connects the valve C4 with the upstream (low pressure) branch 30-1 (31-1) and downstream (high pressure) branch 30-2 (31-2) sides of metering pump MP-A (MP-B) via solenoid actuated control valves A5, A6 (B5, B6), respectively.

Figure 1B:
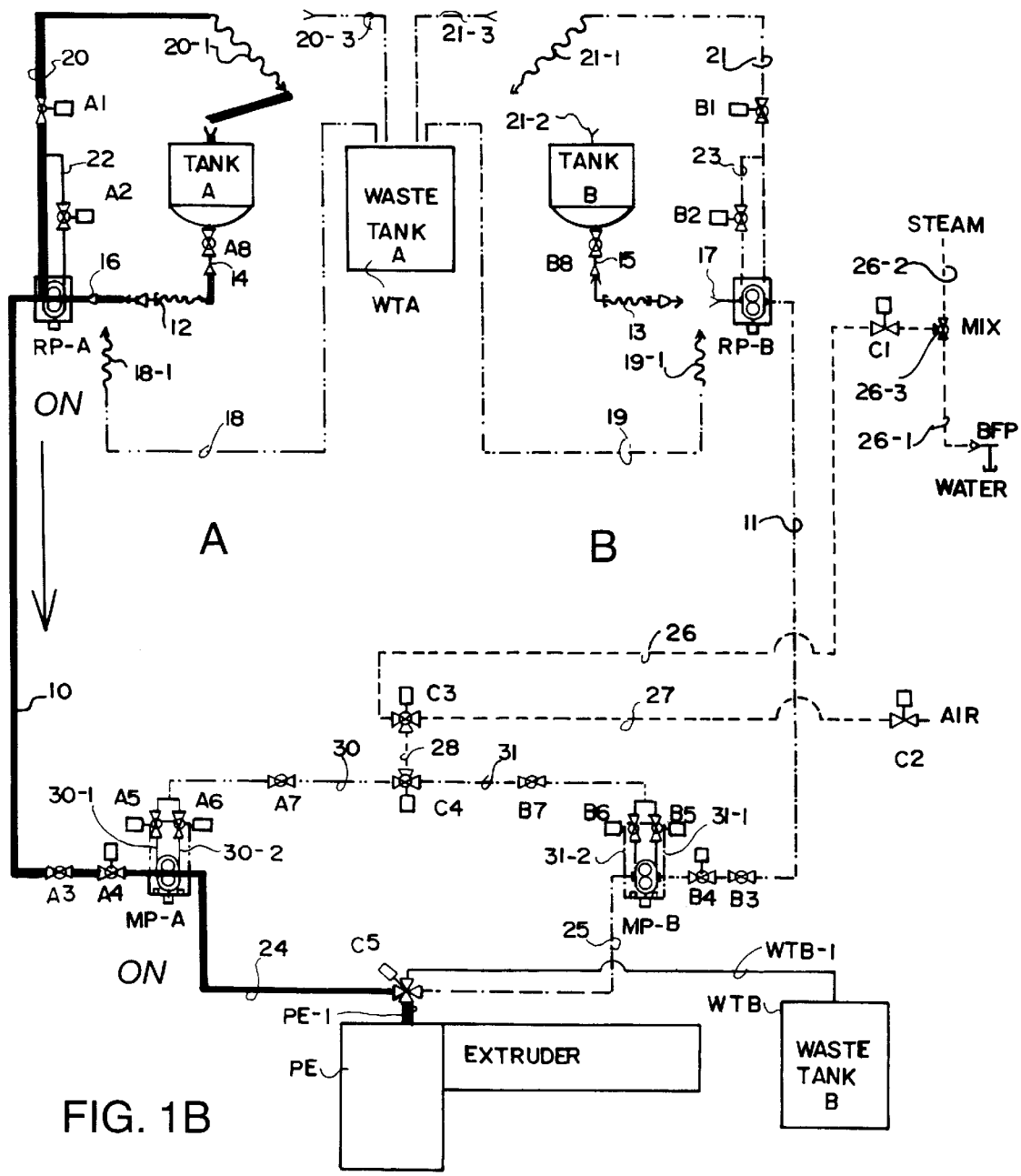
FIG. 1B is a schematic representation of the system depicted in FIG. 1A, but with the components in the "A" side being in a condition to allow injection of additive to the extruder.

Accompanying FIG. 1B shows the operational state of the A-side system described above whereby additive from tank A is being supplied to the polymer extruder PE while the B-side system is present as an available stand-by source of the same or different additive contained within tank B. As is seen, the flexible coupling 12 is connected to the input line 16 of the recirculation pump RP-A, while flexible coupling 20-1 is operatively connected to the input coupling 20-2 of additive supply tank A. With valves A3, A4 and A8 in their respective open condition, and valve A1 being throttled to maintain substantially constant pressure in line 10, the control valve C5 will be in a condition to direct additive flow from supply line 24 to the polymer extruder supply line PE-1. In such a state, therefore, additive is supplied from tank A to the recirculation pump RP-A. A portion of the additive flow is then recirculated via line 20 to return to tank A while the remainder of the additive flow proceeds on to the metering pump MP-A via line 10. The metering pump MP-A forces metered amounts of the additive through line 24, control valve C5 and then on to the polymer extruder PE via the extruder supply line PE-1, in that order. The extruder therefore blends the supplied additive with a polymer melt. The additive-containing polymer melt is then delivered to a downstream forming station (not shown), for example, a spinerette associated with a conventional melt-spinning system for forming synthetic filaments from the polymer melt.

Figure 1C:
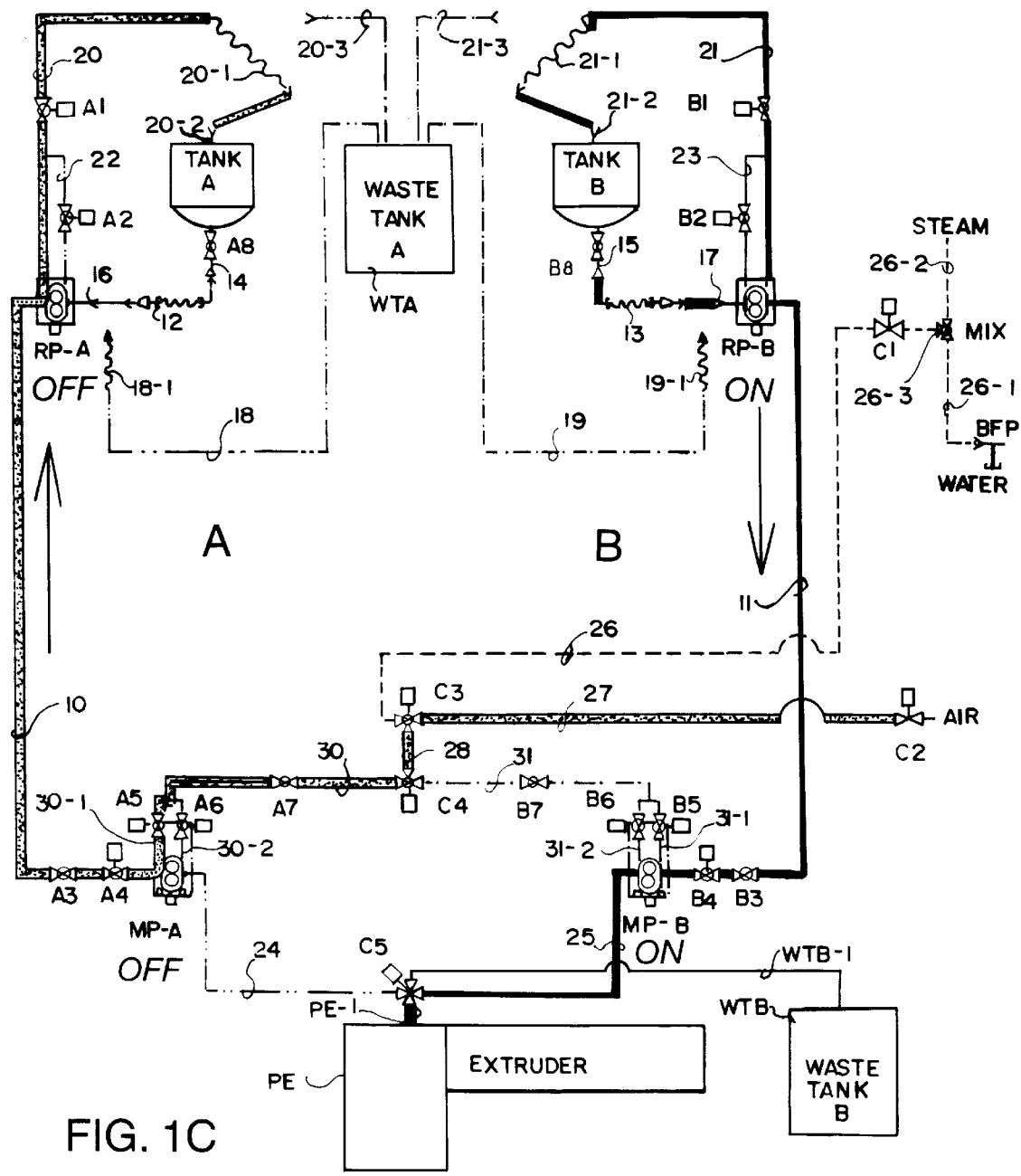
FIG. 1C is a schematic representation of the system depicted in FIG. 1A, with the components in the "A" side being in a condition to allow recovery of residual additive in the process and recirculation lines simultaneously while the components on the "B" side allow additive to be injected into the extruder.

At some point in time, the supply of additive in tank A may become exhausted or the polymer additive recipe may need to be changed (e.g., so as to produce differently colored synthetic filaments). In either case, the B-side system may then supply additive from tank B (which additive in tank B may be the same or different additive as compared to the additive previously supplied via tank A associated with the A-side system). In such a situation, the B-side system is configured as shown in FIG. 1C. That is, the flexible coupling 13 is connected to the input line 17 of the recirculation pump RP-B, while flexible coupling 21-1 is operatively connected to the input coupling 21-2 of additive supply tank B. With valves B3, B4 and B8 in their respective open conditions and valve B1 being throttled to maintain substantially constant pressure in line 11, the control valve C5 will be in a condition to direct additive flow from supply line 25 to the polymer extruder supply line PE-1. In such a state, therefore, additive is supplied from tank B to the recirculation pump RP-B. A portion of the additive flow is then recirculated via line 21 to return to the tank B while the remainder of the additive flow proceeds on to the metering pump MP-B via line 11. The metering pump MP-B forces metered amounts of the additive through line 25, control valve C5 and then on to the polymer extruder PE via the extruder supply line PE-1, in that order.

Simultaneously with the supply of additive from the B-side system as described immediately above, the process lines associated with the A-side system may be purged and cleaned. That is, as a preliminary additive recovery step, the control valves C2, C3 and C4 are operated so that compressed air flows through lines 27, 28 and 30, respectively. Control valve A5 is opened while control valve A6 is closed thereby directing the supplied compressed air to the upstream side of metering pump MP-A. Valves A1, A3 and A4 are opened while valve A2 is closed. As a result, residual additive is forced upstream within line 10 through line 20 and then into the additive supply tank A.

Figure 1D:
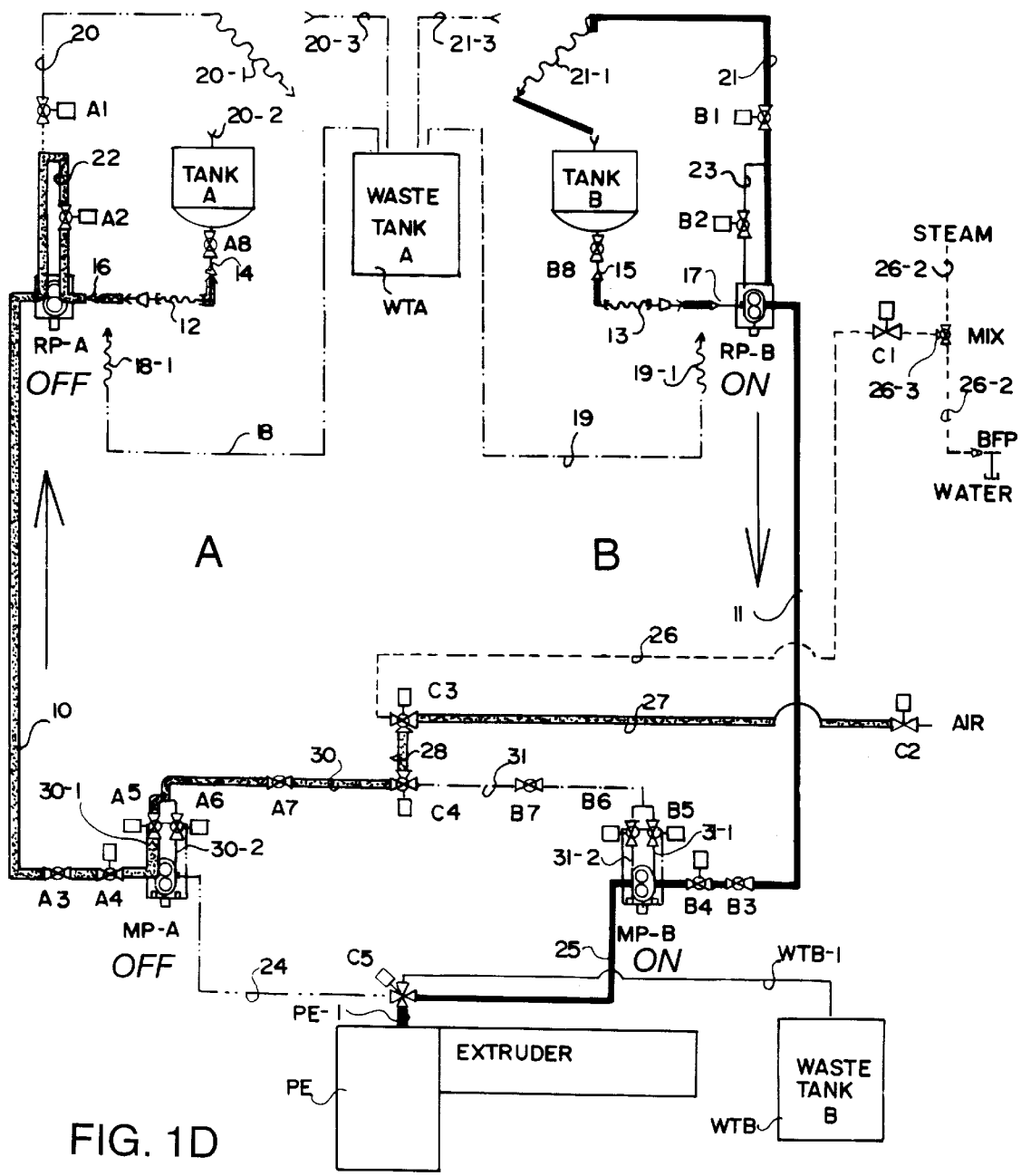
FIG. 1D is a schematic representation of the system similar to that depicted in FIG. 1C, but with the components on the "A" side being in a condition to allow recovery of residual additive in the upstream additive feed lines.

The next step in the recovery step is made by closing valve A1 and opening valve A2 which causes the compressed air flowing upstream within line 10 to flow through the pump bypass line 22. This state of operation is shown in accompanying FIG. 1D. In such a manner, residual amounts of additive in the supply lines 12 and 16 are recovered and directed to tank A by the compressed air back-flushing.

Figure 1E:
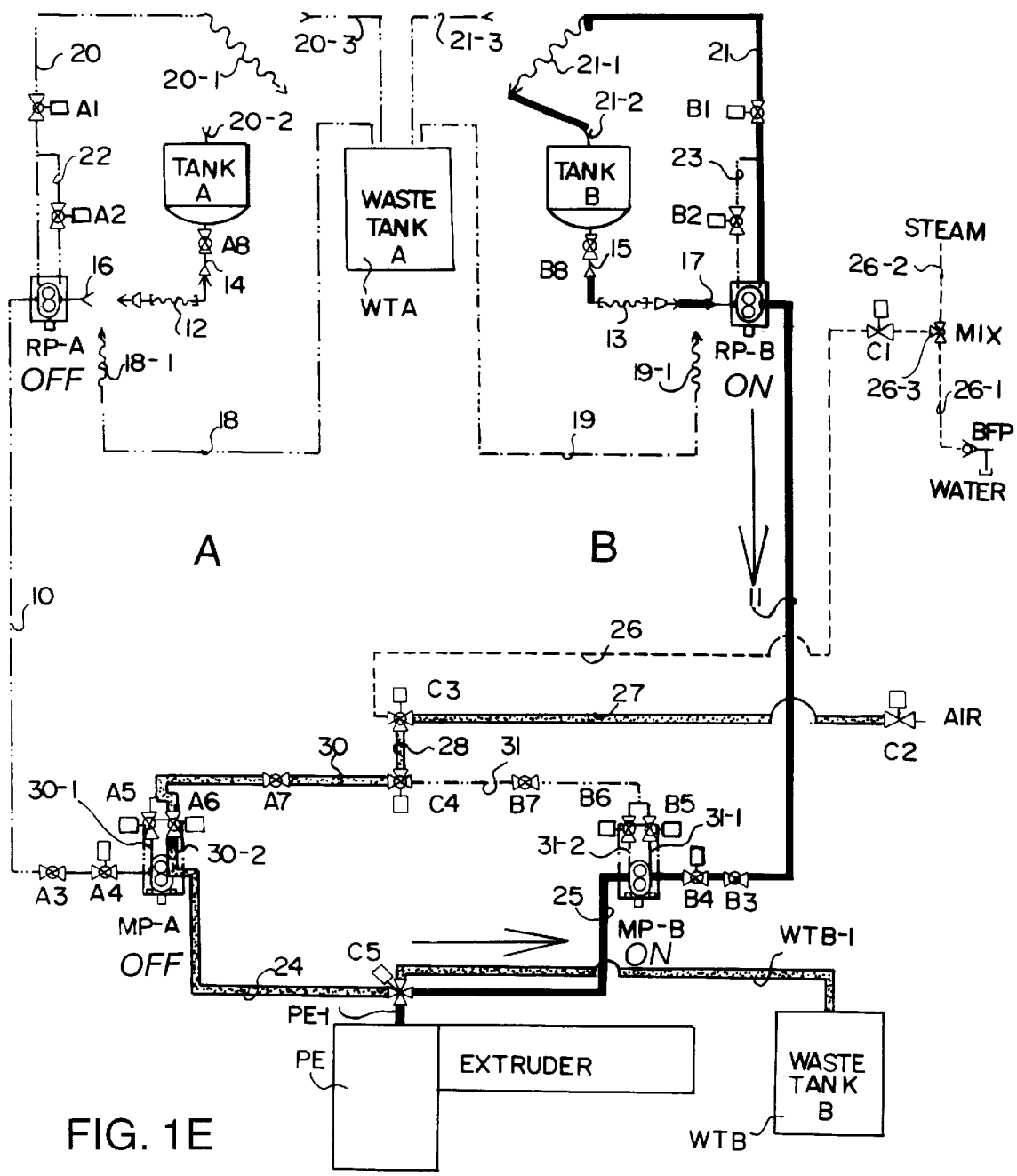
FIG. 1E is a schematic representation of the system depicted in FIG. 1A, but with the components on the "A" side being in a condition to allow air purging of the extruder feed line.

Since the A-side system will eventually supply another additive to the polymer extruder PE, the system of this invention also purges residual additive from the supply line 24 as shown in FIG. 1E. That is, the control valve A5 is closed and the control valve A6 is opened. Such a state allows the compressed air to be directed to the downstream side of the metering pump MP-A and to the valve C5 where it is vented through waste line WTB-1 to the waste tank WTB. The recirculation pump RP-A and the metering pump MP-A are each inoperative during the compressed air purging of FIGS. 1C–1E. Thus, by closely positioning the metering pump MP-A (MP-B) to the control valve C5 and by positioning the control valve C5 closely to the polymer extruder PE, only a small amount of additive remaining in line 24 (25) is actually wasted. The remainder of the additive in the upstream process lines is recovered as described above in connection with FIGS. 1C and 1D. After recovery, valve C2 is closed. At this point, supply tank A is removed and line 20-1 is connected to waste tank fitting 20-3, and flexible waste line 18-1 is connected to pump inlet 16. In this state, the flexible coupling 18-1 is coupled to the input side of the recirculation pump RP-A.

Figure 1F:
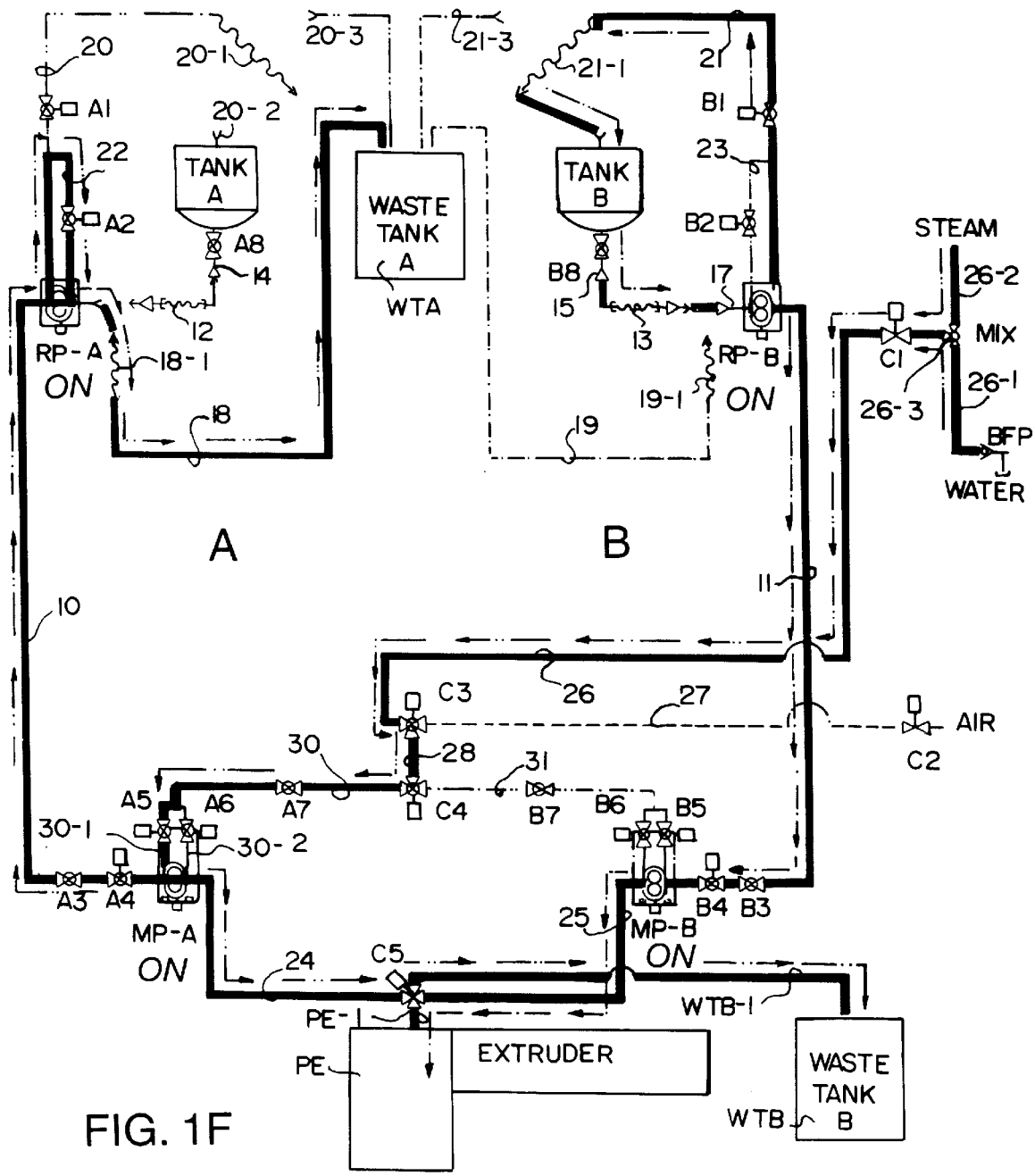
FIG. 1F is a schematic representation of the system depicted in FIG. 1A, with the components on the "A" side being in a condition to allow fluid flushing of the process lines simultaneously with the components on the "B" side being in a condition to allow additive to be fed to the extruder.

The process lines associated with the A-side system may then be cleaned to ensure that no residual additive remains therein that could contaminate new additive that may later be supplied. The initial line cleaning step is depicted in FIG. 1F and, as can be seen, occurs simultaneously with the continuous supply of additive from the B-side system. Hot water solvent is supplied through lines 26 in the manner discussed above by opening valve C1. Valve C3 is operated so that it directs the incoming hot water solvent from line 26 to line 28. Valve C4 is operated so that it then directs the hot water solvent supplied by line 28 to line 30. Control valve A5 is opened along with valves A2, A3 and A4, while valves A1 and A6 are closed.

Unlike the compressed air purging protocol as described above, the recirculation pump RP-A and the metering pump MP-A are each operated during the hot water purging cycle depicted in FIG. 1F. Therefore, the hot water solvent will flow through line 30-1 and then be split so that a portion flows through the metering pump MP-A and on to the waste tank WTB via lines 24 and WTB-1 thereby ensuring that the internal pumping components of the metering pump MP-A are cleaned of residual additive. The remainder of the hot water solvent purge is back-flushed through line 10 and is directed through the pump bypass line 22. A portion of the recirculated water is passed through the recirculation pump RP-A (i.e., since the pump RP-A is operating during this portion of the purge cycle) while the remainder is shunted to the waste tank A via line 18. In such a manner, therefore, the internal pumping components of the recirculation pump RP-A are likewise cleaned of residual additive.

Figure 1G:
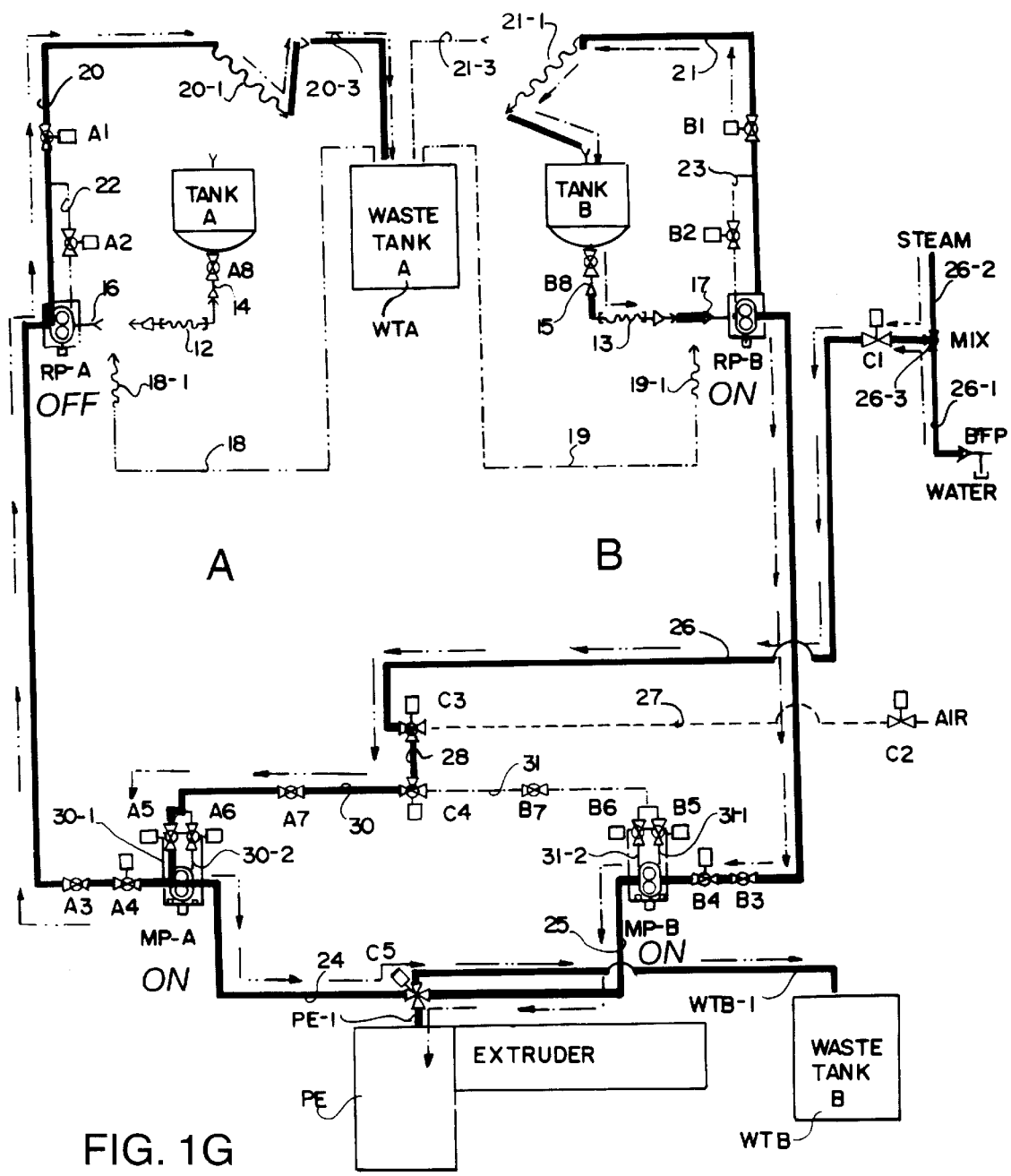
FIG. 1G is a schematic representation similar to that shown in FIG. 1F, but with the "A" side components being in a condition to allow flushing of the recirculation lines.

In order to clean the primary recirculation line, the recirculation pump RP-A is turned off while the valves A1 and A2 are opened and closed, respectively. The recirculation line 20 is fluid-connected to the waste tank WTA via couplings 20-1 and 20-3. Such a state is depicted in accompanying FIG. 1G. The hot water purge will then be forced into the recirculation line 20 thereby back-flushing the same with any residual additive along with the hot water solvent being directed to the waste tank WTA.

Figure 1H:
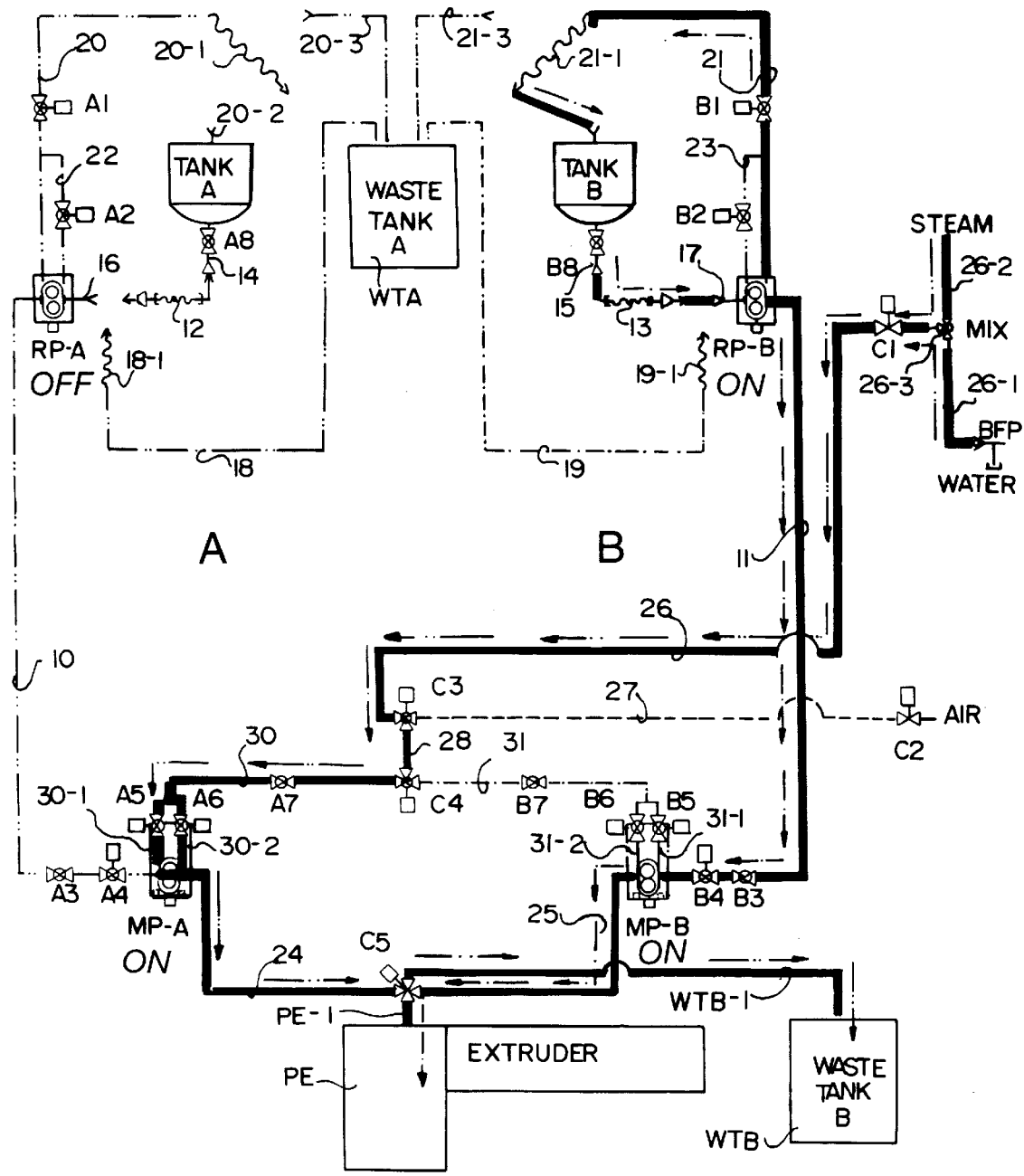
FIG. 1H is a schematic representation similar to that shown in FIG. 1F, but with the "A" side components being in a condition to allow flushing of the lines downstream of the metering pump.

The final step in the hot water purge cycle is to purge line 24 and control valve C5. Such a state is shown in FIG. 1H. In this regard, both valves A5 and A6 are opened so as to allow the hot water solvent supplied via line 30 to be directed into both lines 30-1 and 30-2. Control valve A4 is closed to prevent water from flowing up line 10, thereby reducing the water pressure. As such, the pump MP-A is supplied with fresh hot water solvent. Control valve C5 remains in a state such that the hot water purge is directed to the waste tank WTB via lines 24 and WTB-1.

With the process lines now cleansed of residual additive, they may be dried by repeating the compressed air cycles described above with respect to FIGS. 1C–1E. Thereafter, the additive supply tank A may be replaced with another tank containing the same or different additive as compared to the additive that was previously used as an available stand-by additive source. That is, when the additive being supplied by the B-side system is terminated, the system may be operated so as to then supply additive from the A-side in the manner depicted in FIG. 1B. At that time, the B-side components may then be purged and cleaned in a manner similar to that described previously with respect to FIGS. 1C–1H, except of course, using the corresponding B-side component structures. Therefore, the system of this invention allows additive to be supplied continually with the operation of the polymer extruder PE with minimal additive waste. In addition, the polymer extruder (and its associated downstream equipment) does not necessarily need to be shut down in order to effect additive supplies to be switched between the A-side and B-side systems.

Figure 2:
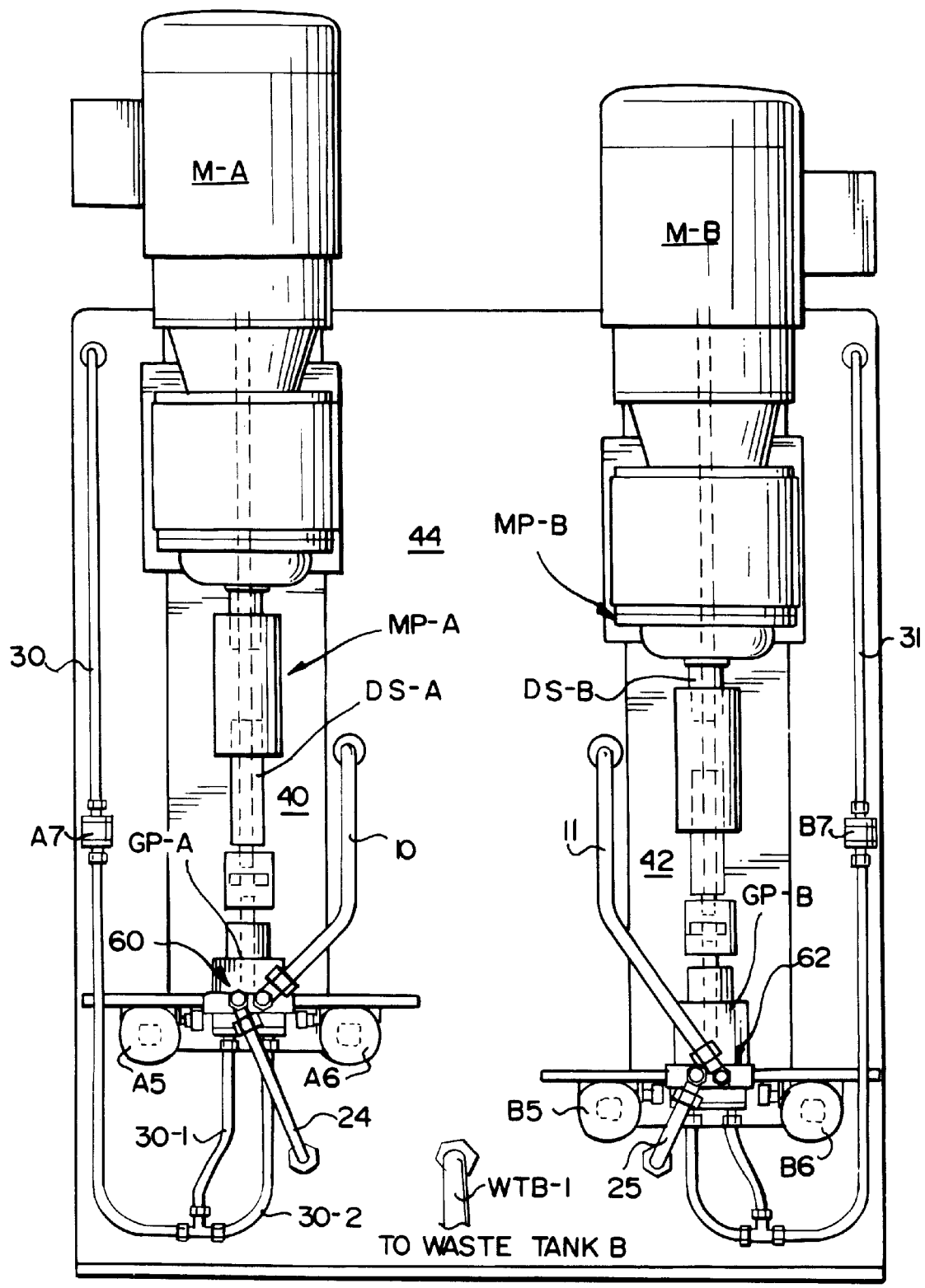
FIG. 2 is a front elevational view showing a preferred equipment layout for the metering pumps and associated process lines employed in the system of this invention.
Figure 3:
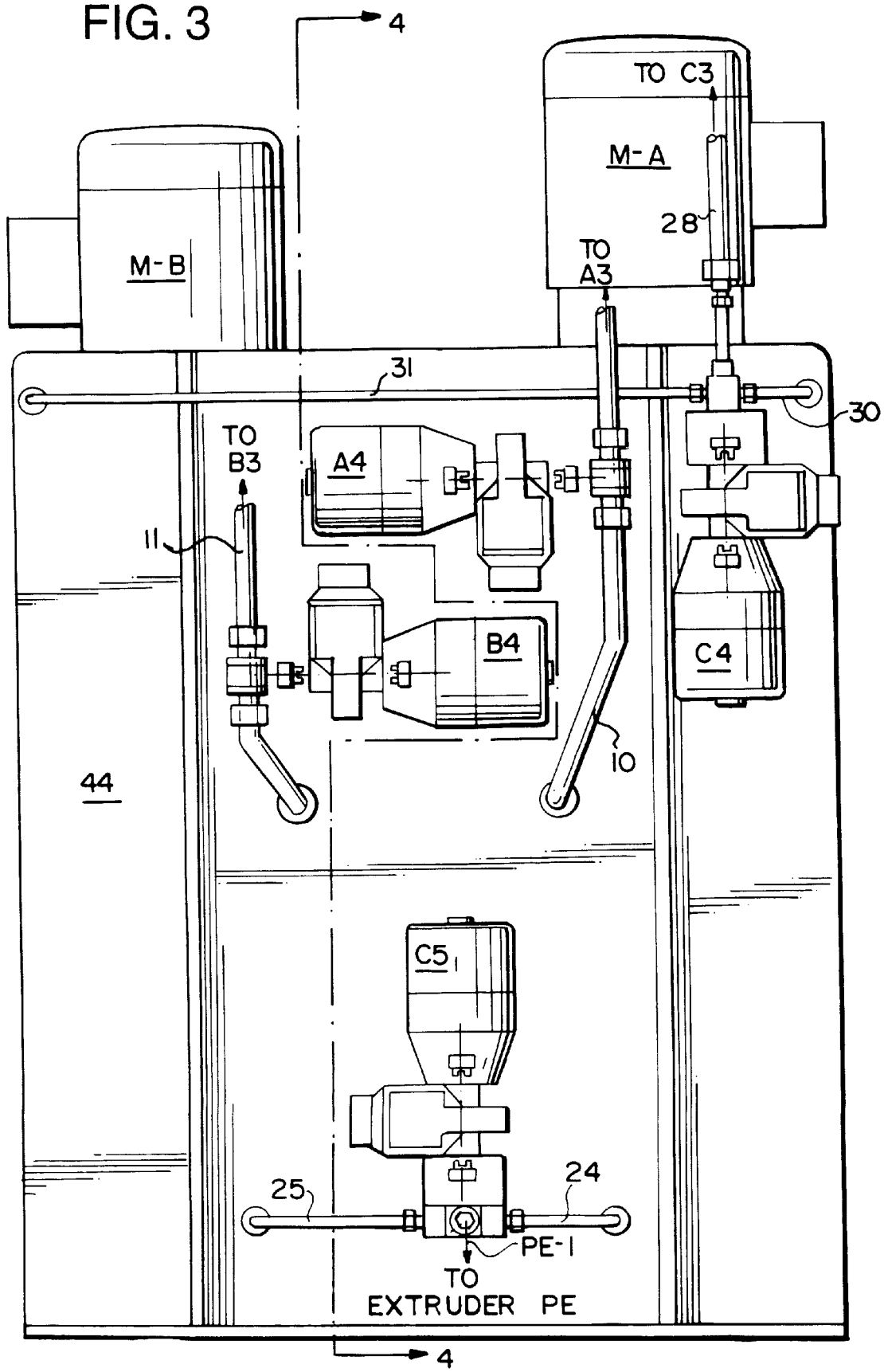
FIG. 3 is a rear elevational view of the equipment layout shown in FIG. 2.
Figure 4:
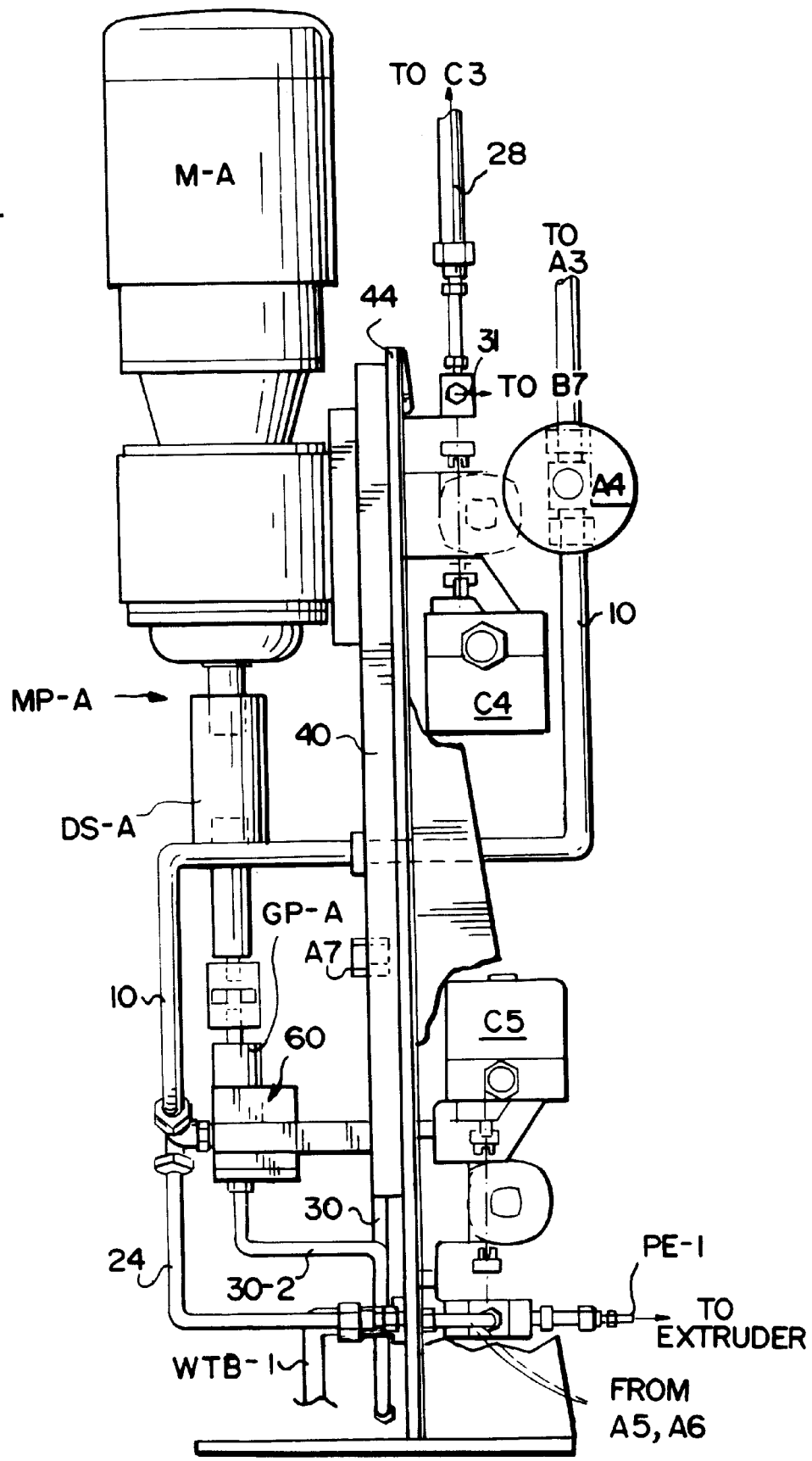
FIG. 4 is a side elevational view of certain "A" side equipment as taken along line 4—4 in FIG. 3.

Accompanying FIGS. 2–4 show an exemplary equipment layout for several of the structural components employed in the system of the present invention. In this regard, it will be observed that support plates 40, 42 are rigidly secured to a back plate 44 so as to support the pump motors M-A and M-B and drive shafts DS-A and DS-B associated with each of the metering pumps MP-A and MP-B, respectively. As is seen, the valves A4–A7 and B4–B7, together with control valves C4 and C5 are mounted as a unit onto the backing plate 44. Moreover, the distal ends of the drive shafts DS-A and DS-B are coupled to a respective removable gear pump GP-A and GP-B which, in turn, is bolted to the manifold block 60, 62. The manifold block 60 receives as inputs lines 10, 30-1 and 30-2 and has line 24 as an output. Similarly, the manifold block 62 receives as inputs lines 11, 31-1 and 31-2 and has line 25 as an output. Thus, the actual pumping components associated with metering pumps MP-A and MP-B are quite compact thereby allowing them to be purged and cleaned quickly of residual additive.

Figure 5:
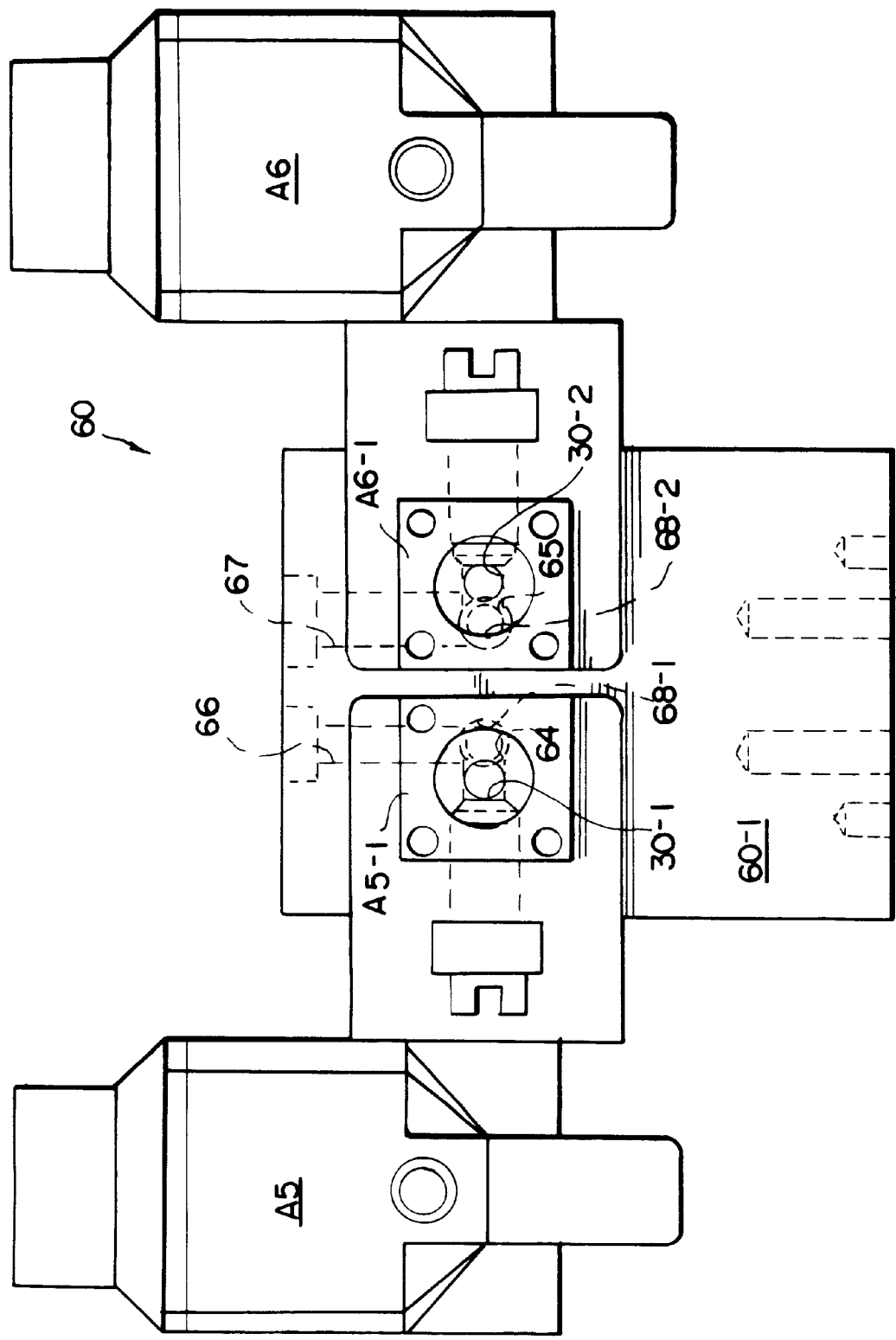
FIG. 5 is a bottom plan view of the manifold assembly depicted in FIG. 6.
Figure 6:
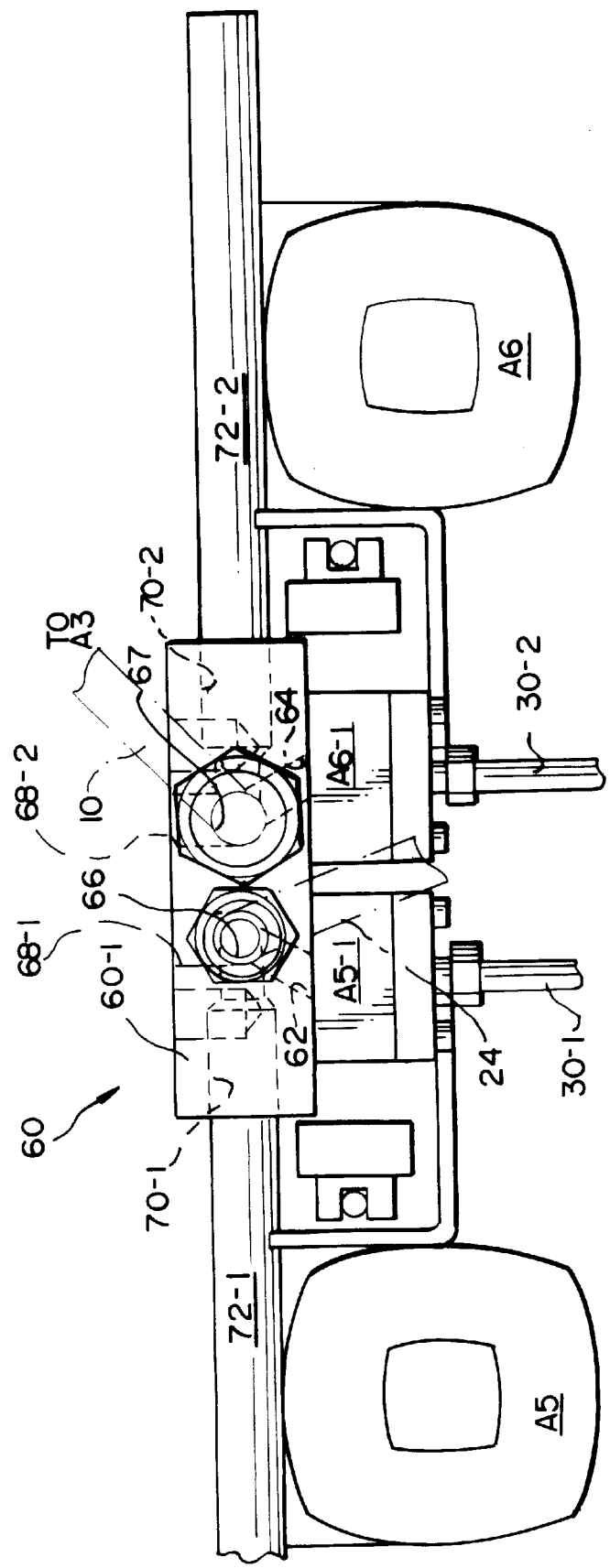
FIG. 6 is an enlarged front elevational view of the manifold assembly that is employed in the system of this invention.

The manifold block 60 associated with metering pump MP-A is shown in greater detail in accompanying FIGS. 5 and 6 and is representative of the manifold block 62 associated with the metering pump MP-B. In this regard, it will be seen that the manifold block 60 includes the valve components A5-1 and A6-1 of solenoid valves A5 and A6 coupled directly to a unitary manifold body 60-1 provided with internal bores 64, 65 which fluid connect lines 30-1 and 30-2 to the internal bores 66, 67 (and hence lines 24 and 10) through valve components A5-1 and A6-1 and to the input (low pressure) and output (high pressure) sides 68-1 and 68-2 of the metering pump MP-A, respectively. In addition, the manifold body 60-1 is provided with sensing ports 70-1 and 70-2 in which pressure transducers 72-1 and 72-2 may be installed so as to sense pressure at the juncture of lines 30-1 and 10 and lines 30-2 and 24, respectively.

As can now be appreciated, the system of the present invention allows relatively quick changes to occur between additives supplied to a common polymer extruder with minimal additive waste. As a result, different polymer "recipes" may be blended in the common polymer extruder PE and supplied to downstream equipment, such as, a spinnerette associated with a conventional synthetic filament melt-spinning assembly without equipment shut down.

The functions described above are preferably operated at least semi-automatically through the use of an operator-interfaced controller (not shown). That is, when changing from an additive supply cycle to a back-flushing cycle, the operator need only confirm (e.g., through suitable annunciator lights or the like) that the proper connections have been made between the main supply line, the recirculation line and the additive supply tank or the waste tank, as the case may be. Thereafter, the air purge cycle may be initiated with the controller issuing command signals to the affected equipment. The solvent cleaning and air drying cycles may then sequentially be activated by the operator once confirmation has been received that the various lines are connected in the appropriate manner.

While the present invention has been described in detail as being especially well suited for the supply of a water-soluble additive, it will be recognized that non-water-soluble additives may be treated in accordance with the present invention, in which case, the solvent supplied during the purge and cleaning cycles will be selected in accordance with the properties of the particular additive employed.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for purging and cleaning process lines of an additive supplied to a thermoplastic melt comprising the steps of:
   (a) supplying an additive from a discharge port of an additive supply tank to an input side of a recirculation pump;
   (b) operating the recirculation pump so as to force the additive from an output side of the recirculation pump through a main supply line to a thermoplastic melt, while continuously recirculating a portion of the additive through a recirculation line fluid-connecting the main supply line at the output side of the recirculation pump to an input port of the additive supply tank; and thereafter
   (c) recovering additive in the main supply and recirculation lines by stopping the operation of the recirculation pump and concurrently forcing the additive out of the main supply line and the recirculation line with a purge fluid.

2. The process of claim 1, wherein the recirculation line has a pump bypass line which fluid-connects the output side of the recirculation pump to the input side of the recirculation pump, and wherein step (c) includes directing the purge fluid through the pump bypass line and to the discharge port of the additive supply tank while the operation of the recirculation pump is stopped.

3. The method of claim 1 or 2, wherein said main supply line has a metering pump downstream of said recirculation pump, and wherein step (b) is practiced by operating said metering pump so that said main supply line supplies additive to an input side of said metering pump, and said metering pump delivers additive from an output side thereof to the thermoplastic melt, and wherein step (c) is practiced with the operation of said metering pump stopped and with the purge fluid supplied to said main supply line at an input side of said metering pump.

4. The method of claim 3, wherein the output side of the metering pump is fluid-connected to a downstream control valve, and wherein step (c) includes directing the purge fluid to the output side of the metering pump, and operating the control valve so that the purge fluid and residual additive therein flows to a waste site.

5. The method of claim 1, further comprising the step of:
   (d) back flushing a cleaning fluid through the main supply line and at least a portion of the recirculation line.

6. The method of claim 5, wherein the recirculation line has a pump bypass line which fluid-connects the output side of the recirculation pump to the input side of the recirculation pump, and wherein the input side of the recirculation pump is fluid-connected to a waste site, and wherein step (d) includes directing the cleaning fluid through the pump bypass line so that a portion of the cleaning fluid passes through the input side of the recirculation pump to the output side thereof, and the remainder of the cleaning fluid is directed to the waste site.

7. The method of claim 6, wherein said main supply line has a metering pump downstream of said recirculation pump and wherein step (d) is practiced by supplying cleaning fluid to an input side of said metering pump and operating said metering pump so that a portion of the cleaning fluid is back-flushed through the main supply line and a remainder of the cleaning fluid passes through the metering pump to an output side thereof.

8. The method of claim 7, wherein the output side of the metering pump is fluid-connected to a control valve having a first discharge branch to the thermoplastic melt, and a second discharge branch to a second waste site, and wherein the control valve is in a position during practice of step (d) to direct the cleaning fluid which passes through the metering pump to an output side thereof to the second waste site.

9. The method of claim 7, further comprising the step of:
   (e) supplying the cleaning fluid to both the input and the output sides of the metering pump.

10. The method of any one of claims 1–2 or 5–9, further comprising supplying an additive from another additive supply tank to the thermoplastic melt simultaneously with the practice of step (c).

11. The method of claim 3, further comprising supplying an additive from another additive supply tank to the thermoplastic melt simultaneously with the practice of step (c).

12. The method of claim 4, further comprising supplying an additive from another additive supply tank to the thermoplastic melt simultaneously with the practice of step (c).

13. The method of claim 1, wherein the purge fluid is compressed air.

14. The method of claim 1, wherein the cleaning fluid is heated water.

15. The method of claim 14, wherein the cleaning fluid is a mixture of water and steam.

16. A method of purging one additive from process lines of a first additive supply system while simultaneously feeding another additive from a second additive supply system to an extruder common to both said first and second additive supply systems comprising the steps of:

(a) fluid-connecting main additive supply lines of both said first and second additive supply systems between a respective additive supply tank and a common control valve such that said one and another additives may respectively be received as an input to said control valve and such that said control valve has one output to the extruder and another output to a waste site;

(b) supplying additive from the additive supply tank of the second additive supply system through the main additive supply line of the second additive supply system and to the common control valve and positioning the common control valve so that the supplied additive is directed to the extruder; while simultaneously (c) back-flushing the main additive supply line of the first additive supply system with a fluid so as to clean the same.

17. The method of claim 16, wherein step (c) includes the sequential steps of:

(c1) forcing pressurized air through the main additive supply line of the first additive supply system so as to force residual additive therein to the additive supply tank;

(c2) purging the main additive supply line of the first additive supply system by passing a solvent fluid through the main additive supply line;

(c3) drying the main additive supply line of the first additive supply system of solvent by passing pressurized air therethrough.

18. The method of claim 16, wherein each main additive supply line of each said first and second additive supply systems has a recirculation line and a recirculation pump, and wherein the method comprises operating the recirculation pump of said second additive supply system so as to force the additive from an output side of the recirculation pump through the main additive supply line thereof to the control valve, while continuously recirculating a portion of the additive through a recirculation line fluid-connecting the main additive supply line at the output side of the recirculation pump to an input port of the additive supply tank.

19. The method of claim 18, wherein the recirculation line has a pump bypass line which fluid-connects the output side of the recirculation pump to the input side of the recirculation pump and the input side of the recirculation pump is fluid-connected to a waste site, and wherein step (c) includes directing the fluid through the recirculation pump bypass line so that a portion of the fluid passes through the input side of the recirculation pump to the output side thereof, and the remainder of the fluid is directed to the waste site.

20. The method of claim 19, wherein said main supply line has a metering pump downstream of said recirculation pump and wherein step (c) is practiced by supplying a cleaning fluid to an input side of said metering pump and operating said metering pump so that a portion of the cleaning fluid is back-flushed through the main supply line and a remainder of the cleaning fluid is passed through the metering pump to an output side thereof.

21. The method of claim 20, wherein the output side of the metering pump is fluid-connected to a control valve having a first discharge branch to the thermoplastic melt, and a second discharge branch to a second waste site, and wherein the control valve is in a position during practice of step (d) to direct the cleaning fluid which passes through the pump to an output side thereof to the second waste site.

22. The method of claim 21, further comprising the step of:

(e) supplying the cleaning fluid to both the input and the output sides of the metering pump.

* * * * *